United States Patent [19]

Nagai

[11] 4,214,704

[45] Jul. 29, 1980

[54] RECIPROCATOR

[75] Inventor: Masashi Nagai, Gahanna, Ohio

[73] Assignee: Rimrock Corporation, Columbus, Ohio

[21] Appl. No.: 903,959

[22] Filed: May 8, 1978

[51] Int. Cl.² .......................... B05B 3/18; F16N 25/00

[52] U.S. Cl. .................................... 239/187; 118/323; 285/302

[58] Field of Search ............... 239/165, 187, 186, 184; 118/321, 306, 323; 285/DIG. 1, 298, 302, 95

[56] References Cited

U.S. PATENT DOCUMENTS

| | | | |
|---|---|---|---|
| 1,513,315 | 10/1924 | Cook | 285/302 |
| 1,776,100 | 9/1930 | Blatt | 239/186 |
| 2,402,157 | 6/1946 | Griswold | 285/302 X |
| 3,008,648 | 11/1961 | Brady, Jr. et al. | 239/186 |
| 3,148,833 | 9/1964 | Wilson et al. | 239/187 X |
| 3,246,847 | 4/1966 | Hammelmann | 239/187 |
| 3,998,388 | 12/1976 | Alagna | 239/187 |

*Primary Examiner*—Andres Kashnikow
*Attorney, Agent, or Firm*—Pearne, Gordon, Sessions

[57] ABSTRACT

Apparatus for moving a reciprocating fluid-emission head automatically through successive, variable-speed, variable-function operating cycles that include linear extension and retraction to and from a space within which predetermined operations are to be sequentially performed. The apparatus has an elongated fixed frame, an intermediate carriage on the frame and a head carriage on the intermediate carriage, the head carriage being adapted to support the fluid emission head. The carriages are moved simultaneously between a retracted position coextensive with the frame and an extended position by chain and sprocket drive, the maximum extension of the fluid emission head being about twice the length of the frame due to the double extension achieved by extending both carriages simultaneously. A plurality of fluids to be sprayed (including, e.g. liquid lubricant) are transmitted from a manifold block on the fixed frame to the reciprocating emission head by a plurality of inflexible, extensible fluid conduits. The operation of the apparatus is controlled by means of pulses generated in response to motion of the chain and sprocket drive for the carriages and by a pulse counter adapted to count the pulses being generated and to count a plurality of preset position representative totals.

7 Claims, 17 Drawing Figures

RECIPROCATOR

BACKGROUND OF THE INVENTION

This invention relates to reciprocating type operating heads that travel automatically through successive variable-speed, variable-function operating cycles that include linear extension and retraction to and from a space within which predetermined operations are to be sequentially performed. More particularly, the invention relates to an apparatus for moving the operating head automatically through the desired cycle and especially where the head travels past working surfaces, such as dies for forming metals, between operating cycles of the dies, such as in die-casting, and performs certain functions, such as, but not limited to, spraying a lubricant on the surfaces and at other times emitting an air blast to remove flash, and the like, formed at parting lines, and to cool the working parts.

In many industrial forming processes, such as the molding, die-casting, drawing and forging of metals and other materials, it is common practice to apply a lubricant to the working surfaces between each forming cycle. At the same time, while the mold or die sections are separated, other operations are often performed, such as blowing air against the forming surfaces to remove any residual flash that many remain around the die cavities, and also blowing air or spraying air and water to cool surfaces which are difficult to cool with the integral circulating cooling system normally provided. The lubricant, which is generally in liquid or powdered form, improves the flow of the metal or other material being formed, reduces wear of the working parts, and facilitates removal of the newly-formed product from the mold or die. Often two different types of liquid are to be sprayed during an operating cycle.

To apply the lubricant automatically and thus avoid the necessity of having a worker move between the opposed platens of an open die or mold between cycles, mechanical reciprocating devices are commonly used. These devices move a spray head past the surfaces of the mold or die to be lubricated while the platens are separated, and spray intermittently so as to apply the lubricant to the desired surfaces. Such devices commonly have air blast nozzles as well to help cool various working parts and also to remove flash.

When the forming cycles are repeated quite rapidly, it is necessary to move the spray head and associated equipment at high speed between the open die sections, since the dwell time during which the mold or die platens remain open after removal of the newly-formed part is relatively short. Since it is normally difficult to speed up the actual spraying time and still achieve effective lubrication, it is most important that the time intervals during which the equipment is not spraying be kept as short as possible. Accordingly, a relatively fast speed of travel is used during nonspraying movement and a somewhat slower speed, or complete stop, is used when lubricating material is being sprayed.

The state of the art in this field is shown by the following patents and other publication:

| U.S. Pat. No. | To | Issued |
|---|---|---|
| 3,482,652 | Stone III | Dec. 9, 1969 |
| 2,929,564 | Stone III | March 22, 1960 |
| 2,344,905 | Short | March 21, 1944 |
| 3,525,382 | Devol | Aug. 25, 1970 |

-continued

| | | |
|---|---|---|
| 3,522,838 | Ott | Aug. 4, 1970 |
| 2,695,592 | Szczepanski | Nov. 30, 1954 |
| 3,393,658 | Ott | July 23, 1968 |
| 3,544,355 | Ott | Dec. 1, 1970 |
| 954,241 | Affelder and Gorton | April 5, 1910 |
| 3,870,164 | Haase | March 11, 1975 |
| 3,699,592 | Miller | June 13, 1972 |
| 3,998,388 | Alagna | Dec. 21, 1976 |
| 3,463,399 | Ott | Aug. 26, 1967 |
| 4,041,899 | Wolfe and Heath | Aug. 16, 1977 |

| German Patent Specification No. | Issued |
|---|---|
| 1,296,743 | Jan. 22, 1970 |

and the following publications:

Acheson Technical Brochure, entitled "Dag Swing Arm Reciprocator for automatic spraying of pressure die casting dies"

Rimrock Corp. technical data sheet for Reciprocator Model 001, Model 002, Manifold and Nozzle Assemblies Model 104

Rimrock Corp. technical report No. 3 entitled "How problem tooling runs more profitably at Kolsters Tool and Die"

G-W Plastics Engineers, Inc., technical bulletin 300R

Most of the prior art devices in the references listed above utilized fluid-drive means, such as hydraulic or pneumatic cylinder-and-piston assemblies. The fluid cylinders require high pressure seals in order to prevent fluid leakage and these seals are subjected to continual wear, as well as high temperatures, due to close proximity to the dies or molds, thus requiring periodic replacement in order to prevent a malfunction of the device.

A few devices utilize purely mechanical drive means, such as screw-and-ball-nut-type drive, as shown in U.S. Pat. No. 4,041,899, however, in each case the device, in order to provide the necessary length of travel of the operating head, is exceptionally long and since most are mounted over the machine or molding apparatus to be serviced, considerable overhead height is required, at least a height equal to the length of the reciprocating path of travel of the operating head. Many installations, however, do not have sufficient height overhead and thus are severely limited as to utilization of the particular space.

Another problem that has been encountered with prior art apparatus resides in the necessity to use flexible hoses, or other flexible conduits, to connect between the fixed parts of the device, a manifold, for example, to the reciprocating fluid emission head. Due to the repeated reciprocating movement, the hose is continually flexing and is subject to considerable wear leading to leakage and failure. While one device (U.S. Pat. No. 3,998,388) utilizes telescoping tubes to convey fluid from a fixed manifold to the moving fluid emission head, the device encounters the problem of accommodating the volume of fluid that is displaced when the head is retracted and the telescoping tube assembly is collapsed. The resulting need to force the fluid into an accumulator imposed undesirable stresses on the pumping system and conduits and renders the device impractical.

Another disadvantage of prior art devices is the limitations as to motion and spray functions that can be achieved during a particular cycle. Prior art devices often use timers to control the operating cycles and while these are satisfactory, they often require continuous readjustments due to changes in speed, for example, that occur due to temperature changes in the equipment and particularly in the fluid used to drive the operating head.

The device of the present invention, however, reduces the difficulties indicated above and affords other features and advantages heretofore not obtainable.

SUMMARY OF THE INVENTION

It is among the objects of the invention to minimize the length or height, as the case may be, of an apparatus for automatically moving a fluid emission head through a linear extension and retraction cycle during which certain predetermined operations are to be performed.

Another object is to provide a multiple extension arrangement which permits a reciprocating apparatus of the type described to extend a fluid emission head a distance greater than the length or height of the supporting structure for the extension apparatus.

A further object of the invention is to eliminate looped flexible hoses from reciprocators of the type described, that have been used to connect a fluid emission head to fixed connections on the frame for the apparatus.

Still another object is to eliminate variations in the accuracy and uniformity of the location of the fluid emission head in a reciprocator of the type described as various functions are initiated during the operating cycle.

Still another object is to provide improved means for setting up and adjusting a reciprocator of the type described and for expanding the capability for performing a variety of different sequential operations during an operating cycle.

These and other objects and advantages are achieved by the novel apparatus of the invention wherein there is provided an elongated fixed frame, an intermediate carriage on the frame and a head carriage on the intermediate carriage and adapted to support the operating head. The carriages are moved between a retracted position coextensive with the frame and an extended position by chain and sprocket drive means, including one chain and sprocket drive means on the main frame driven by a rotary fluid motor, and operatively connected to the intermediate carriage and a second chain sprocket drive means located on the intermediate carriage and operatively connected to the head carriage. The maximum extension of the operating head is about twice the length of the fixed frame due to the double extension achieved by extending both carriages simultaneously in the same direction.

In accordance with one aspect of the invention which relates to a specific application, a plurality of fluids to be sprayed (including e.g. liquid lubricant, spray air, blow air, etc.) are transmitted from a manifold block on the fixed frame to a reciprocating manifold block on which the emission head is mounted by means of a plurality of inflexible extensible fluid conduits. The conduits that transmit liquids comprise an assembly of axially expanding and collapsing rigid tubes, including a pair of coaxial tubes fixed relative to one another and which define an annular space therebetween, and a middle tube received in the annular space to define with the pair of tubes, two coaxial annular spaces, including an inner space and an outer space. Seals are provided on both sides of the middle tube at the forward end to seal the inner and outer spaces and ports are provided in the middle tube to connect the inner and outer spaces to one another.

The internal cross sectional area of the middle tube is approximately the same as the cross sectional area of the outer annular space so that as the assembly is elongated from a collapsed condition with the middle tube extending substantially into the annular space between the pair of coaxial tubes, but the volume of fluid within the middle tube is increased, but the volume of fluid in the outer annular space is correspondingly decreased so that the total volume of fluid in the assembly remains the same. During the collapsing movement of the assembly, the volume of fluid in the outer annular space is correspondingly increased so that, again, the total volume of fluid remains constant.

In accordance with the preferred form, two of such tube assemblies are serially connected with porting therebetween to provide the amount of elongation required due to the double extension achieved by the carriages that reciprocate the fluid emission head and that simultaneously expand and collapse the tube assemblies of the extensible fluid conduits.

The operation of the apparatus is controlled by means of pulses generated in response to movement of the chain and sprocket drive means for the carriages, and by a counter unit with one or more adjustable counters, adapted to count the pulses being generated. The counters activate a plurality of step initiating means that generate sequential operating signals to initiate preselected operating functions for the operating head and preselected conditions of motion for the head at each sequential step in the cycle. The step initiating means also serves to activate timers for controlling the duration of each sequential step.

BRIEF DESCRIPTION OF THE DRAWINGS

FIG. 1 also shows certain associated control components in diagrammatic form;

DESCRIPTION OF THE PREFERRED EMBODIMENT

Figure 1:
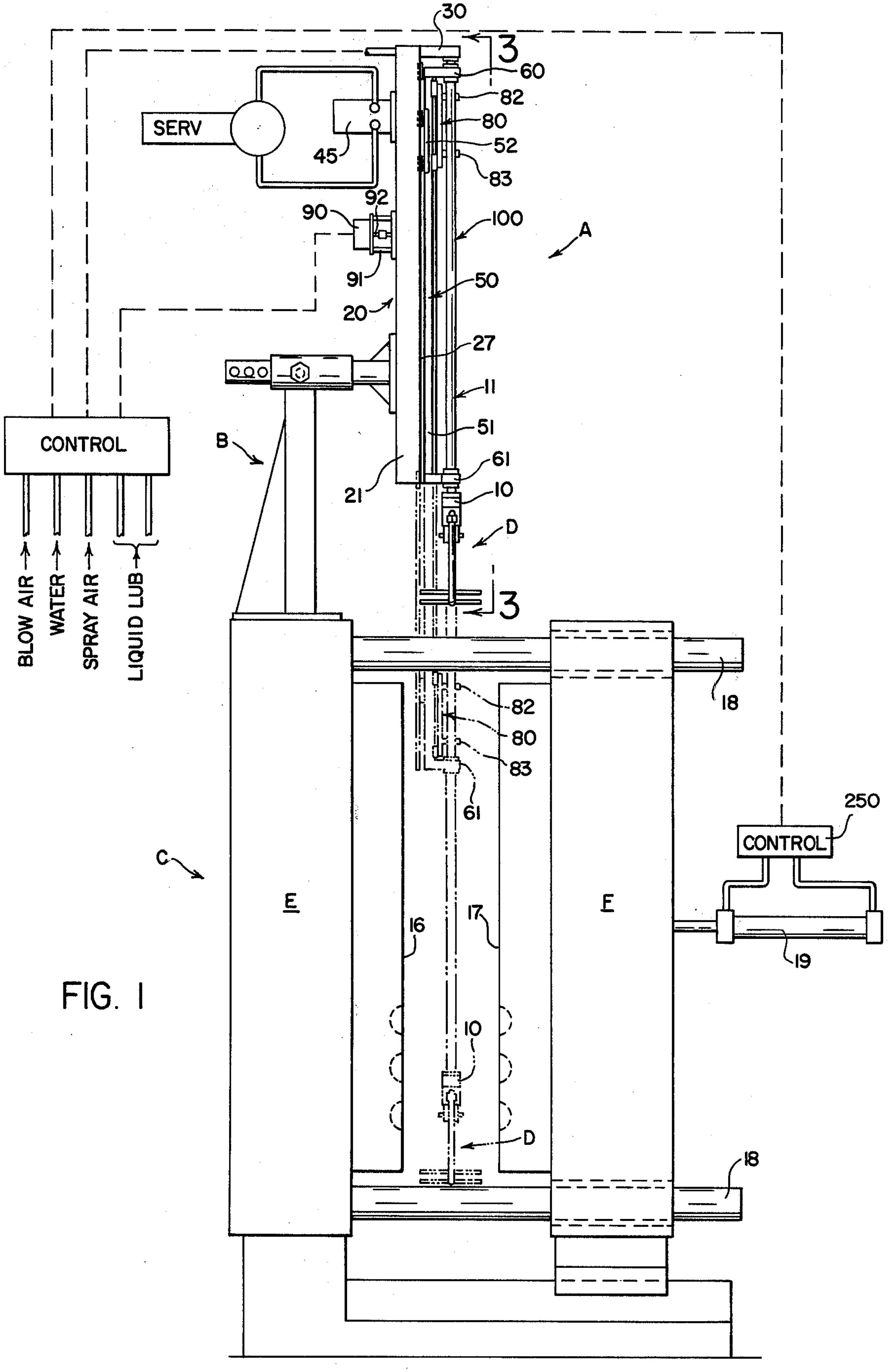
FIG. 1 is a side elevation of a die-casting machine with an apparatus associated therewith for reciprocating a fluid emission head between the die sections between molding operations, and showing the reciprocating apparatus in a retracted condition in solid lines and in fully extended condition in dashed lines.

Referring more particularly to the drawings and initially to FIG. 1, there is shown a reciprocating spray apparatus A embodying the invention mounted by a swivel mount B to a die-casting machine C. The apparatus A is adapted to support and move a reciprocating fluid emission head D successively. through variable speed, variable-function operating cycles that include linear extension and retraction to and from the space between a stationery platen E and movable platen F of the die-casting machine C within which space predetermined spraying and blowing operations are to be sequentially performed. The swivel mount B is adapted to accurately position the apparatus A so that the fluid emission head D is midway between the two platens E and F when in their open position with maximum spacing therebetween. It will be seen from FIG. 1 that the length of travel during extension of the fluid emission head D is considerable, particularly in view of the limited height of the apparatus A. This long extension, in view of the limited height of the apparatus A, is a particular advantage achieved with the apparatus of the invention.

GENERAL DESCRIPTION

The fluid emission head D, which may be selected from among many suitable designs currently available in the art, is mounted on a head manifold block 10, and the manifold block 10 is moved through its predetermined linear extension-retraction cycle with the unique reciprocating mechanism of the apparatus A which generally comprises a fixed frame assembly 20 with a first chain and sprocket drive assembly 40 supported thereon (FIGS. 2, 4 and 8), an intermediate carriage assembly 50 mounted for travel on the fixed frame assembly 20 and with a second chain and sprocket drive assembly 70 mounted thereon (FIGS. 2, 4 and 7), and a head carriage assembly 80 mounted for travel on the intermediate carriage assembly 50. The head manifold block 10 is supported by and fluid is transmitted thereto by means of five inflexible, but extensible, conduits, including two liquid lubricant conduits 11 and 12 which may carry different liquid lubricants or parting agents, two extensible air conduits 13 and 14 that carry spray air and blow air and a water conduit 15.

Figure 2:
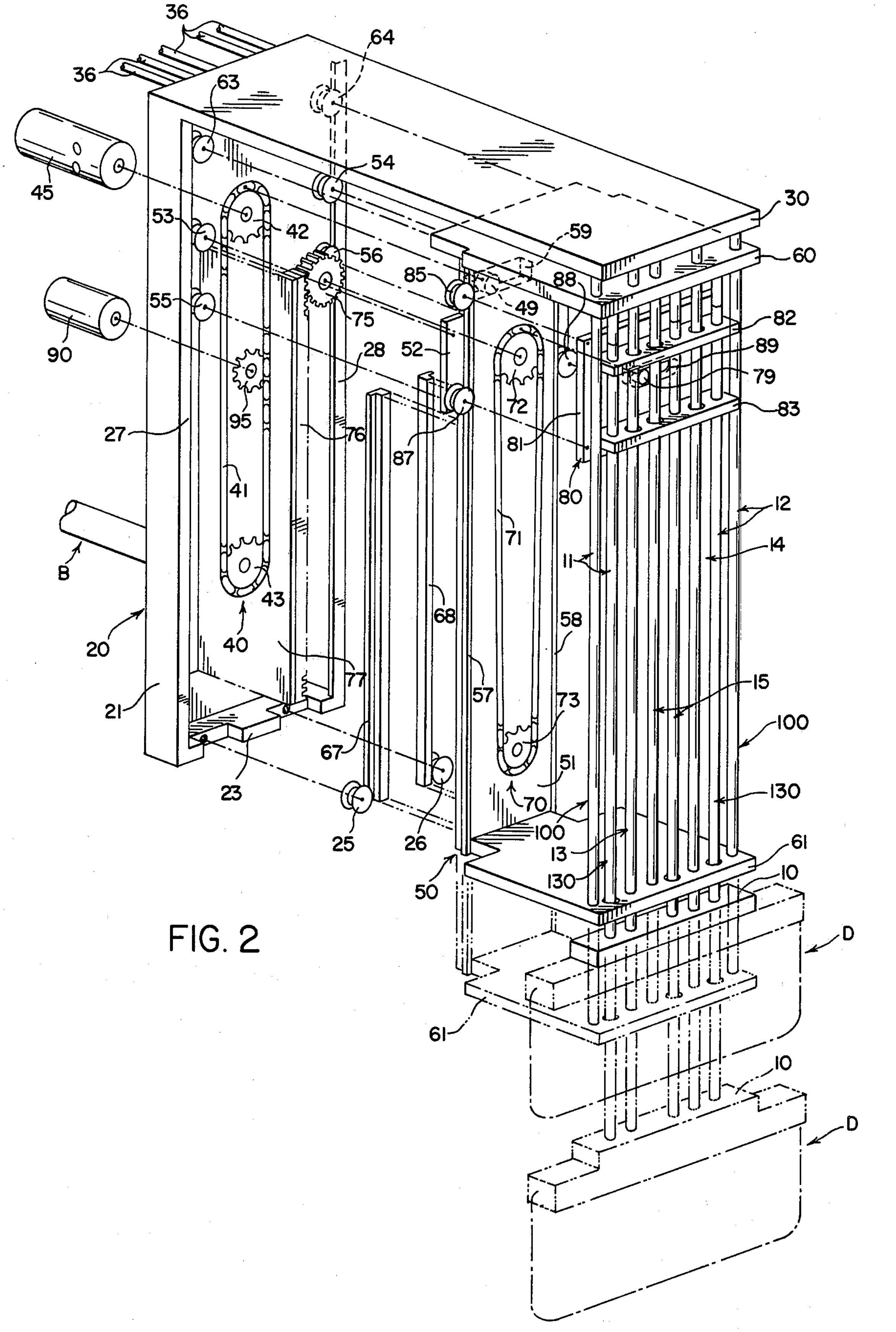
FIG. 2 is an exploded perspective view mostly in diagrammatic form illustrating the operation of the apparatus of FIG. 1.

As the carriages 50 and 80 are extended simultaneously by the two chain and sprocket drive assemblies 40 and 70, the conduits 11, 12, 13, 14 and 15 simultaneously elongate (i.e., expand in an axial direction) to carry the head manifold block 10 and fluid emission head D down between a pair of matched dies 16 and 17 when in their open, widely spaced position as shown in FIG. 1. The movable platen F carrying the die 17 travels on guide rods 18 and is moved by means of a fluid cylinder 19. It will be noted that with the double extension achieved by simultaneous extension of the carriages 50 and 80, the total length of extension is approximately twice the overall height of the fixed frame assembly 20. The general arrangement of the apparatus A is best illustrated in FIG. 2.

FIXED FRAME ASSEMBLY

The fixed frame assembly 20, best shown in FIGS. 4 and 8-13, comprises an elongated channel member 21 formed of rolled steel, for example, secured to the swivel mount B by bolts 22 and which serves as a support for the other components. A bottom block 23 is bolted to the bottom end thereof (FIGS. 4, 8 and 13) and has a pair of guide rollers 25 and 26 journaled thereon. Also, a pair of vertical guide rails 27 and 28 are bolted to the faces of the outer flanges of the channel member 21 for guiding the intermediate carriage assembly 50, as will be described in detail below.

Figure 6:
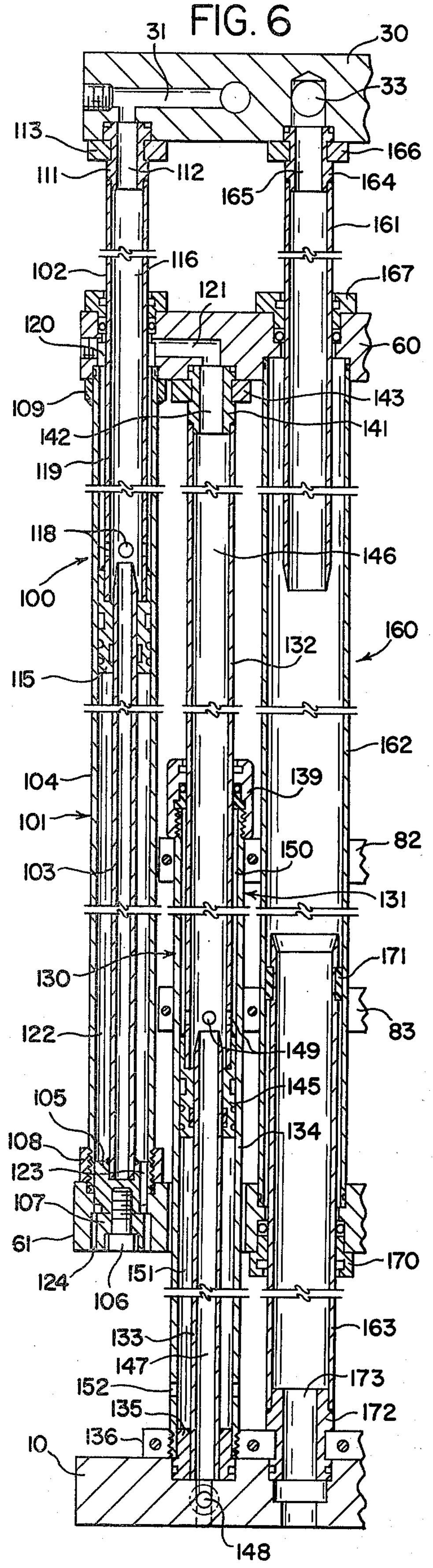
FIG. 6 is a fragmentary sectional view on an enlarged scale, similar to FIG. 5, broken at several locations and illustrating the construction of the extensible fluid conduits embodied in the apparatus of the invention in a partially extended condition.
Figure 3:
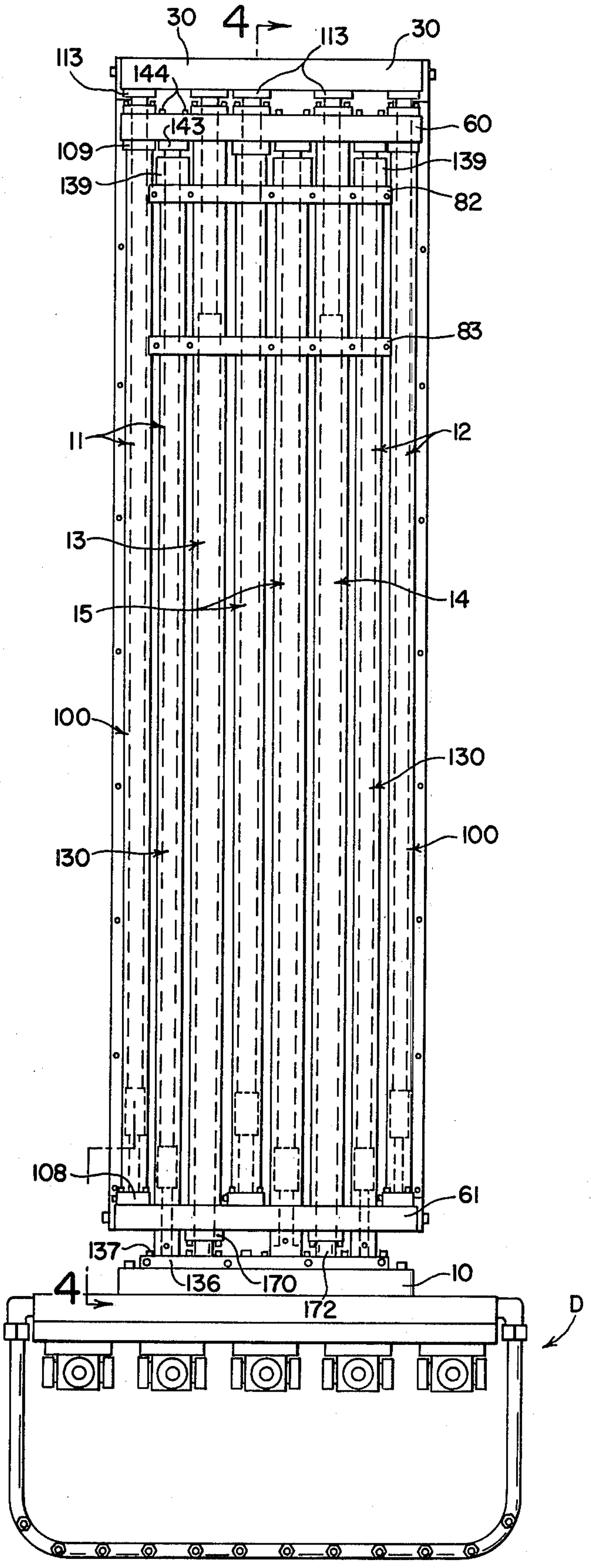
FIG. 3 is a front elevation of the reciprocator apparatus of FIG. 1 taken from the line 3—3 of FIG. 1 and showing the reciprocator in a fully retracted condition.
Figure 4:
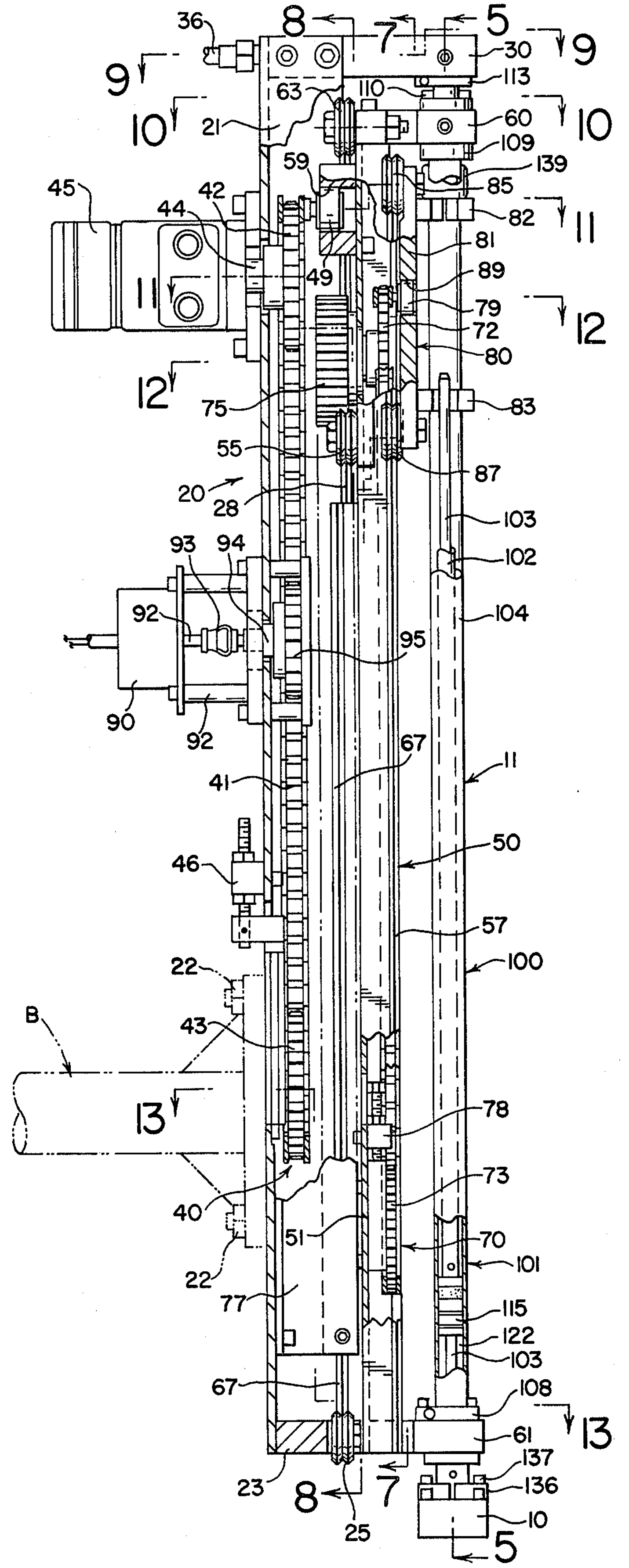
FIG. 4 is a sectional view on an enlarged scale with parts broken away taken on the line 4—4 of FIG. 3.
Figure 5:
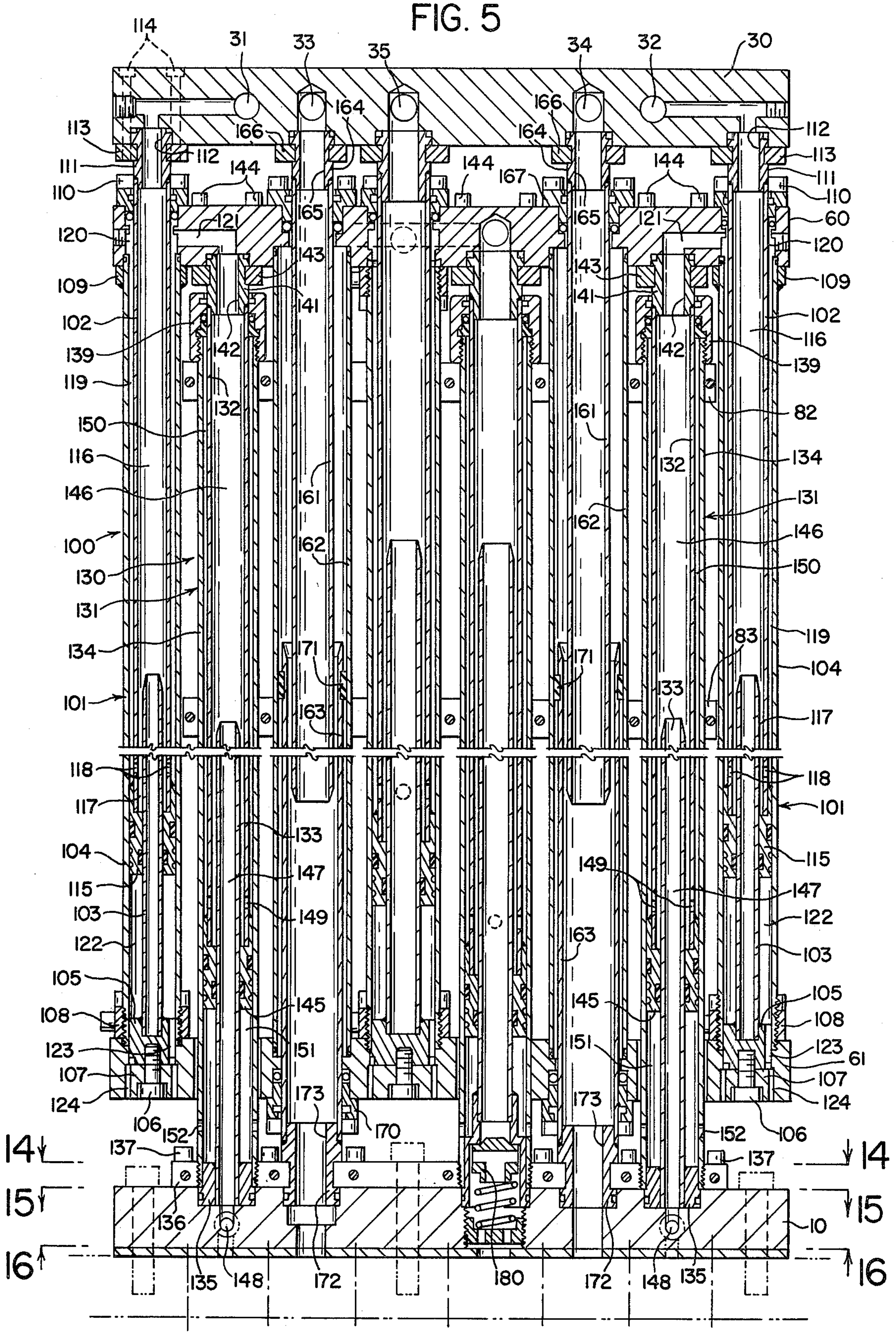
FIG. 5 is a broken sectional view on an enlarged scale taken on the line 5—5 of FIG. 4 and showing the reciprocating apparatus in a fully retracted condition.

At the upper end of the fixed frame assembly 20, is a fixed manifold block 30 (FIGS. 3, 4, 5 and 9) secured thereto by bolts and having drilled therein five ports for the various fluids to be transmitted to the extensible conduits 11, 12, 13, 14 and 15, which are connected to the lower face of the block 30 as best shown in FIGS. 5 and 6. The ports include ports 31 and 32 for liquid lubricant, ports 33 and 34 for air, and port 35 for water. Each of the ports communicates with a fitting 36 for connecting the respective port to a flexible supply hose.

Figure 8:
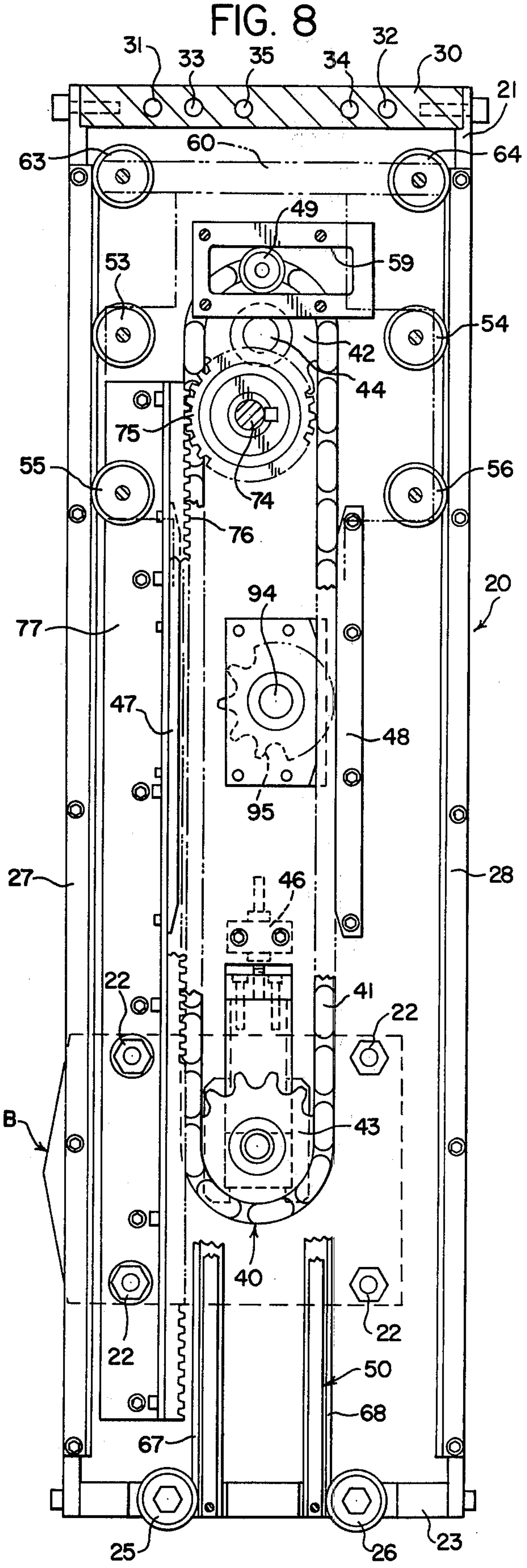
FIG. 8 is a sectional view on an enlarged scale with parts broken away taken on the line 8—8 of FIG. 4.
Figure 9:
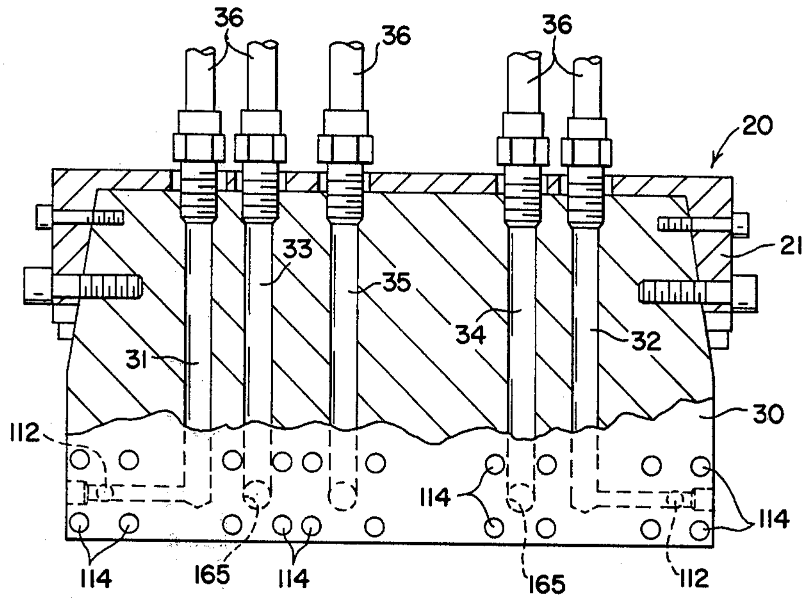
FIG. 9 is a fragmentary sectional view on an enlarged scale with parts broken away taken on the line 9—9 of FIG. 4.
Figure 10:
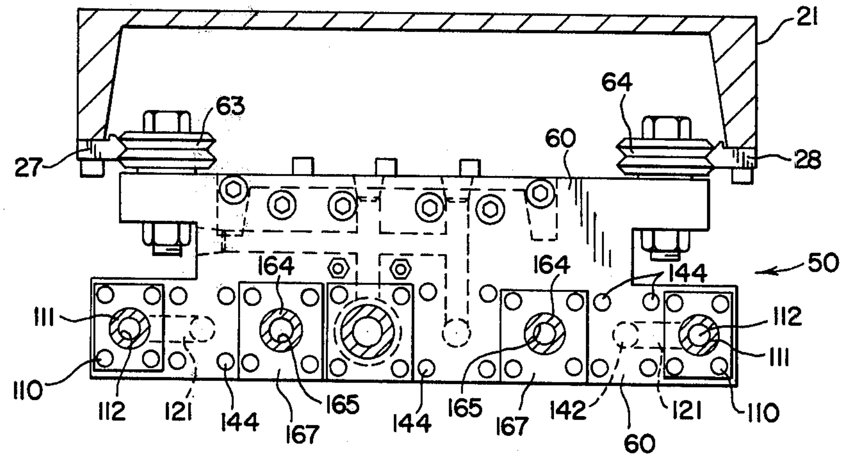
FIG. 10 is a sectional view on an enlarged scale taken on the line 10—10 of FIG. 4.
Figure 11:
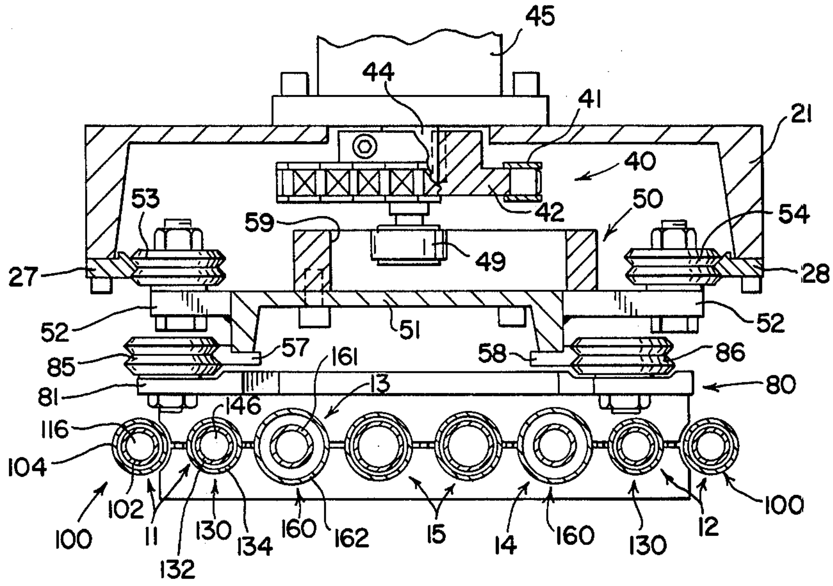
FIG. 11 is a fragmentary sectional view on an enlarged scale taken on the line 11—11 of FIG. 4.
Figure 12:
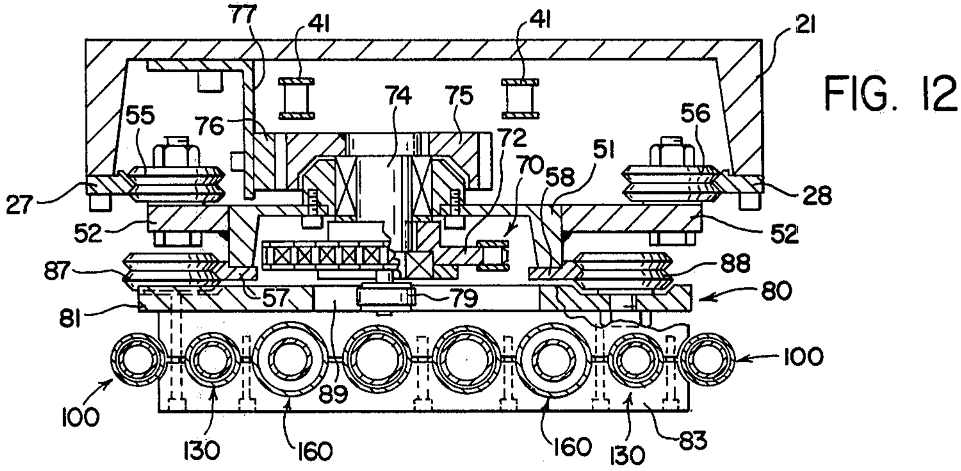
FIG. 12 is a sectional view on an enlarged scale taken on the line 12—12 of FIG. 4.
Figure 13:
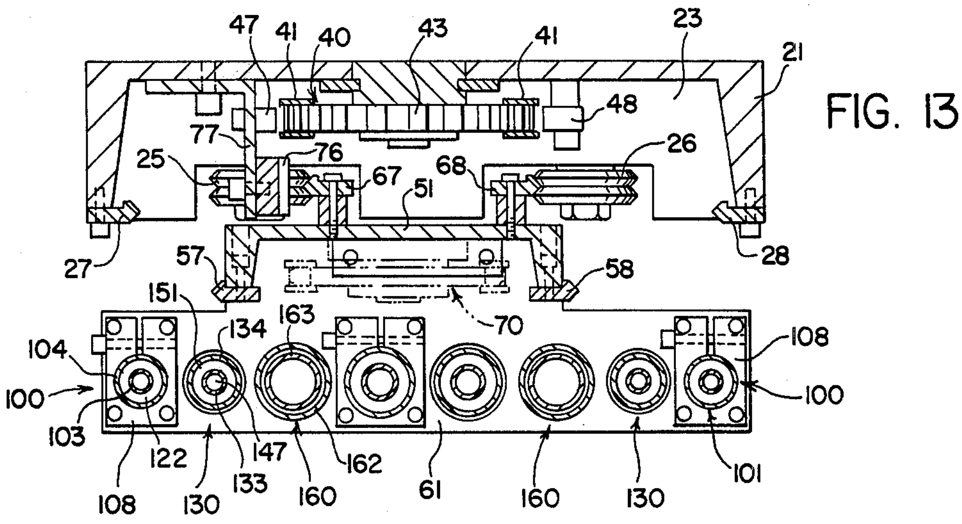
FIG. 13 is a sectional view on an enlarged scale taken on the line 13—13 of FIG. 4.

Also mounted on the fixed frame assembly 20 is the first chain and sprocket drive assembly 40 which includes a roller chain 41, a drive sprocket 42 and an idler sprocket 43. The drive sprocket 42 is keyed to the output shaft 44 of a hydraulic drive motor 45 (FIGS. 1, 2 and 4) and the idler sprocket 43 is journaled in a suitable bearing assembly which is engaged by a conventional tension adjusting unit 46. Travel of the roller chain 41 between the sprockets 42 and 43 is guided by chain guides 47 and 48 as indicated in FIGS. 8 and 13. One of the links of the chain 41 carries a drive roller 49 (FIGS. 4 and 8) operatively associated with the intermediate carriage assembly 50 to reciprocate the intermediate carriage assembly through its extension and retraction movement.

The motion induced by the chain 41 and drive roller 49 is of a modified sinusoidal character, since while constant linear movement is induced in the passes of the chain between the sprockets 42 and 43, a gradual decrease in velocity to a full stop is induced as the chain link carrying the roller 49 passes around a respective sprocket and this is followed by a gradual increase in velocity from the null point as the chain link carrying the roller 49 moves from the upper or lower limit of travel in a curved path to the following linear span between the sprockets. Accordingly, abrupt changes in motion are avoided, all of the reversals in direction of movement being gradual and, as indicated above, of a modified sinusoidal character.

INTERMEDIATE CARRIAGE ASSEMBLY

The intermediate carriage assembly 50 includes an elongated channel member 51 formed of rolled steel, for example, having a length slightly less than the length of the channel member 21 (FIGS. 4, 7, 11, 12 and 13), but of a width only about half that of the channel member 21. A pair of extension plates 52 are welded near the upper end of the channel member 51 and serve to support four guide rollers 53, 54, 55 and 56, which engage the guide rails 27 and 28 on the fixed frame assembly 20. A pair of vertical guide rails 57 and 58 are bolted to the outer edge faces of the flanges of the channel member 51 for guiding the head carriage assembly 80 in a manner described below.

Bolted to the inner face of the channel member 51 are blocks which form a guide slot 59 that receives the drive roller 49 of the first chain and sprocket drive assembly 40. The slot 59 has a length sufficient to permit lateral movement of the drive roller 49 as the roller is carried by the respective chain link from one side of a sprocket to another during changes in direction of movement.

Welded to the upper end of the channel member 51 is an intermediate manifold block 60 (FIGS. 3, 4, 5, 6, 7 and 10) which serves as a support for movable components of the extensible conduits 11, 12, 13, 14 and 15. The block 60 also carries a pair of guide rollers 63 and 64 that engage the guide rails 27 and 28, respectively, as do the rollers 53, 54, 55 and 56 to guide the intermediate carriage assembly 50 through reciprocating travel. The respective components of the extensible conduits 11, 12, 13, 14 and 15 are anchored to the block 60 by special seal blocks bolted to the top of the intermediate manifold block 60 and which permit sliding movement therethrough. A bottom carrier block 61 (FIG. 13) is welded to the bottom of the channel member 51. A pair of outwardly extending parallel guide rails 67 and 68 are bolted to the rearward face of the channel member 51 and are engaged by the rollers 25 and 26 (FIG. 13).

Figure 7:
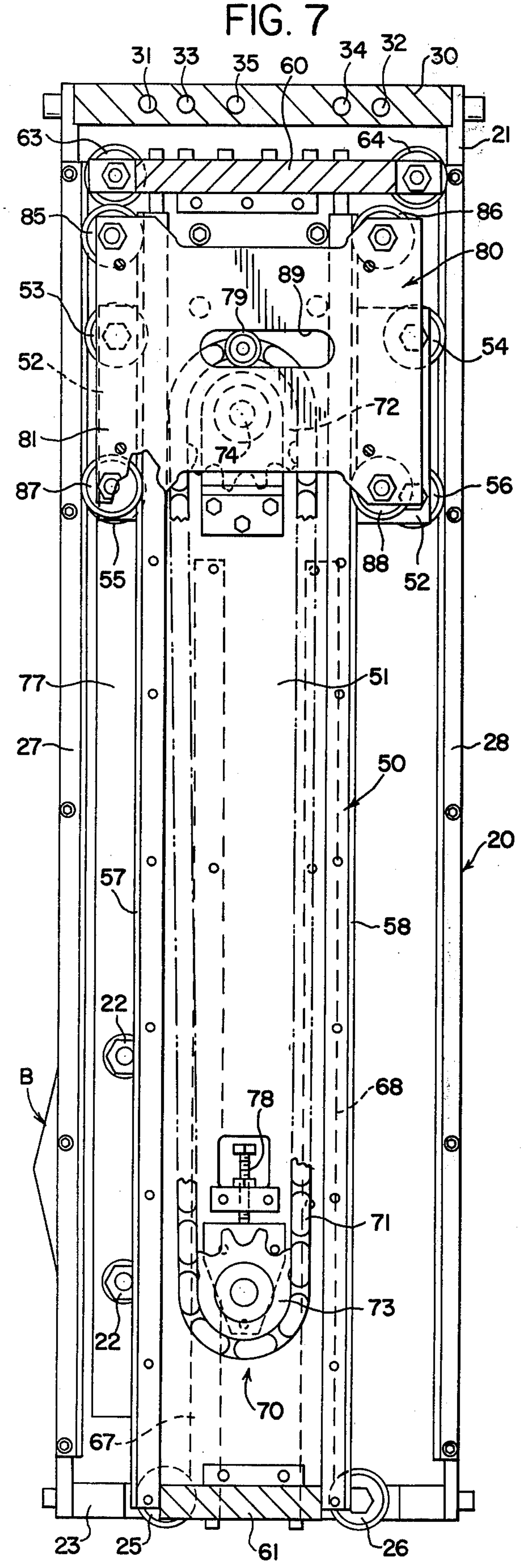
FIG. 7 is a sectional view on an enlarged scale with parts broken away taken on the line 7—7 of FIG. 4.

The second chain and sprocket assembly 70 is supported by the elongated channel member 51, as best shown in FIGS. 2, 4 and 7, the assembly including a roller chain 71, a drive sprocket 72 and an idler sprocket 73. The drive sprocket 72 is keyed to a shaft 74 journaled in the channel member 51 and which also has keyed thereto on the opposite side of the channel member 51 a pinon 75 which engages a vertical rack 76 bolted to a bracket 77 which is in turn bolted to the channel member 21 of the fixed frame assembly 20. The idler sprocket 73 is journaled in a suitable bearing block and tension is adjusted by a tension adjuster assembly 78 carried on the channel member 51.

As the intermediate carriage assembly 50 is extended and retracted by the first chain and sprocket drive assembly 40, the pinion 75 is likewise turned, as a result of engagement with the fixed rack 76, so that the drive sprocket 72 is turned simultaneously with the movement of the intermediate carriage assembly 50. A drive roller 79 is carried by one link of the roller chain 71 and is operatively associated with the head carriage assembly 80 to cause the head carriage assembly to extend and retract as the guide roller 79 is carried by the chain through the respective spans of chain travel between the sprockets 72 and 73. Thus, it will be seen that the two chain and sprocket drive assemblies 40 and 70 cause a double extension movement so as to extend the head manifold block 10 through a much longer path of travel than could be obtained with a single extension mechanism.

HEAD CARRIAGE ASSEMBLY

The head carriage assembly 80 includes a guide plate 81 (FIGS. 4, 7 and 12) and has a pair of split carrier blocks 82 and 83 bolted thereto. The two carrier blocks are each bolted together and are connected to respective components of the extensible conduits 11, 12, 13, 14 and 15 to serve a function to be described below. The guide plate 81 has four guide rollers 85, 86, 87 and 88 journaled thereon and which engage and travel along the respective guide rails 57 and 58 bolted to the intermediate carriage assembly 50. Accordingly, the head carriage assembly 80 travels relative to the intermediate carriage assembly 50 between a retracted position, shown in solid lines in FIG. 1, and an extended position, shown in dashed lines in FIG. 1.

Also the guide plate 81 has a guide slot 89 cut therethrough that receives the guide rollers 79 of the intermediate chain and sprocket assembly 60. Thus, the roller 79 drives the head carriage assembly 80 in much the same manner as the roller 49 drives the intermediate carriage assembly 50.

ENCODER

As part of the control system for the apparatus A, a digital incremental encoder 90 (FIGS. 1, 2 and 4) is mounted on a bracket 91 bolted to the outside of the fixed channel member 21. The encoder 90 has a shaft 92 that is connected by a flexible coupling 93 to another shaft 94 that extends through an opening in the channel member 21 and has a sprocket 95 keyed thereto and adapted to engage the roller chain 41 of the first chain and sprocket drive assembly 40. Accordingly, movement of the roller chain 41 in either direction causes rotation of the sprocket 95 and corresponding rotation of the encoder shaft 92. The encoder 90 is adapted to convert increments of shaft rotation to electrical pulses that are representative of the position of the fluid emission head D during its operating cycle.

The device utilized in the preferred embodiment is identified by the trade designation "SERIES E ROTARY ENCODER" and is manufactured and sold by Madison Electric Products, Inc. of Madison, Ohio. The encoder 90 produces 200 pulses for each revolution of the sprocket 95.

FLUID CONDUITS

The extensible fluid conduits 11, 12, 13, 14 and 15 connected between the fixed manifold block 30 and the head manifold block 10 are best shown in FIGS. 2, 3, 5 and 6. The conduits 11 and 12 for the liquid lubricants are essentially identical and will be described only with respect to the conduit 11. Also, the air conduits 13 and 14 are essentially identical and will be described only with respect to the conduit 13. The water conduit 15 is somewhat the same as the two liquid lubricant conduits 11 and 12, although somewhat larger, but nevertheless, will be described only with respect to those features which differ from the construction of the conduits 11 and 12.

The conduit 11, best illustrated in FIG. 6, comprises two parallel and somewhat similar tube assemblies serially connected to one another and including an upper tube assembly 100 and a lower tube assembly 130. The upper tube assembly 100 generally comprises a double coaxial tube unit 101 that travels with the intermediate carriage assembly 50 and a middle tube unit 102 that is fixed with respect to the frame assembly 20.

The double coaxial tube unit 101 includes an inner tube 103 and a coaxial outer tube 104, the lower ends thereof being sealed by an end plug 105 which is welded to the bottom of the inner tube 103 and anchored to the bottom carrier block 61 by a bolt 106 with a spacer block 107. The lower end of the outer tube 104 has external threads that receive a threaded clamp ring 108 that is used to tighten the double tube unit into position. A radial flange ring 109 is welded near the upper end of the outer tube 104 and bears against the bottom surface of the intermediate manifold block 60. The upper end of the outer tube 104 extends into a circular recess in the bottom of the imtermediate manifold block 60 and is held therein by bolts 110.

The middle tube 102 extends into the annular space between the inner tube 103 and outer tube 104 and has an end plug 111 at its upper end with a central opening 112 therein. The end plug 111 seats in a circular recess in the lower surface of the fixed manifold block 30. An annular split clamp ring 113 is received in an annular groove in the end plug 111 and is fastened by four machine screws 114 (FIGS. 5 and 9) to the fixed manifold block 30.

An end seal 115 is welded to the lower end of the middle tube 102 and serves to seal the end thereof against the outer surface of the inner tube 103 and the inner surface of the outer tube 104.

The liquid lubricant to be sprayed travels through the passage 31 in the fixed manifold block 30, through the central passage 112 in the plug 111 and into a central passage 116 in the middle tube 102. At the lower end of the middle tube 102, the fluid passes through four radial ports 118 into an outer annular passage 119 between the middle tube and the outer tube 104. The outer annular passage 119 communicates with an annular chamber 120 in the intermediate manifold block 60 and the chamber 120 communicates with a passage 121 formed in the block 60 so as to provide a serial connection between the upper tube assembly 100 and the lower tube assembly 130.

It will be noted that as the intermediate carriage assembly 50 is extended, the double coaxial tube unit 101 is moved downward relative to the middle tube 102 by the intermediate manifold block 60, as viewed in FIG. 5, so as to increase the volume of fluid in the central passage 116, but at the same time, decrease the volume of fluid in the outer annular passage 119. The cross sectional area of the central passage 116 is approximately equal to the cross sectional area of the outer annular passage 119 so that the increase in volume of fluid in the central passage 116 is compensated for during extension by the corresponding decrease in the volume of fluid in the outer annular passage 119. Accordingly, the tube assembly 100 can expand and collapse without any change in the volume of liquid lubricant therein.

The lower annular space 122 between the coaxial tubes 103 and 104 below the end seal 115 contains air which enters and exits through a port 123 in the end plug 105 that communicates with an annular space 124 surrounding the spacer block 107.

Figure 14:
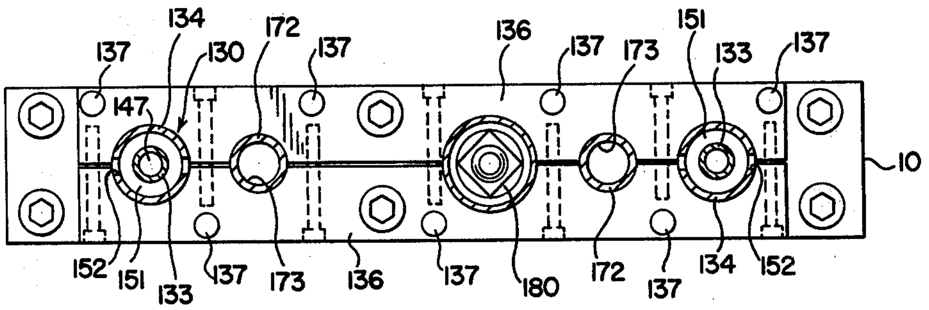
FIG. 14 is a sectional view on an enlarged scale taken on the line 14—14 of FIG. 5.
Figure 15:
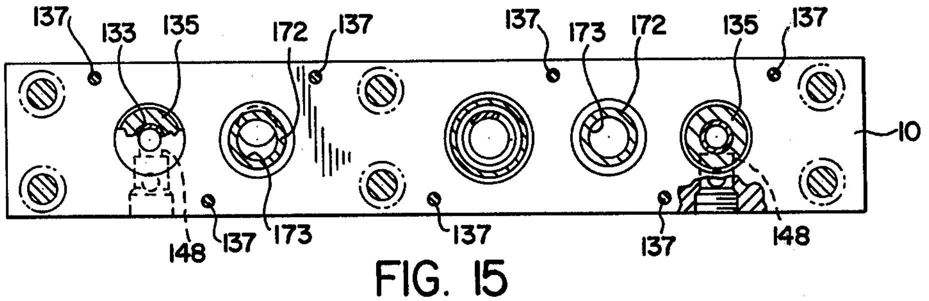
FIG. 15 is a sectional view on an enlarged scale showing the head manifold block for the fluid emission head of the apparatus of the invention taken on the line 15—15 of FIG. 5 and with parts broken away for the purpose of illustration.

The lower tube assembly 130 is similar in construction to the upper tube assembly 100 and includes a double coaxial tube unit 131, anchored at its lower end to the head manifold block 10 and a middle tube 132 connected at its upper end to the intermediate manifold block 60. The coaxial tube unit 131 includes an inner tube 133 and a coaxial outer tube 134, the lower end of the inner tube 133 having a radial sleeve 135 welded thereto and extending downwardly into a circular recess formed in the top of the head manifold block 10. The lower end of the outer tube 134 is threaded into a threaded opening in a split anchor plate 136 and the anchor plate 136 is secured by bolts 137 to the head manifold block 10 (FIGS. 5 and 14).

The outer tube 134, which has external threads at its upper end, extends through openings in and is tightly clamped by both of the split tie bars 82 and 83 of the head carriage assembly 80. An end seal block 139 with internal threads receives the upper end of the outer tube 134 and also seals against the middle tube 132.

The lower portion of the middle tube 132 extends into the annular space between the inner tube and outer tube 134 and has an end plug 141 welded at its upper end with a central passage 142 formed therein communicating with the port 121 in the intermediate manifold block 60. The end plug 141 is received in a circular recess in the bottom face of the intermediate manifold block 60.

A split clamp ring 143 seats in an annular groove formed in the end plug 141 and is bolted to the intermediate manifold block 60 by machine screws 144 (FIGS. 5 and 10) to secure the middle tube 132 in place. The lower end of the middle tube 132 has an end seal 145 welded thereto with seals that provide a sliding seal against the outer surface of the inner tube 133 and the inner surface of the outer tube 134.

Both of the split tie bars 82 and 83 of the head carriage assembly 80 are securely clamped around the outer tube 134 so that the outer tube travels with the head carriage assembly during extension and retraction.

Figure 16:
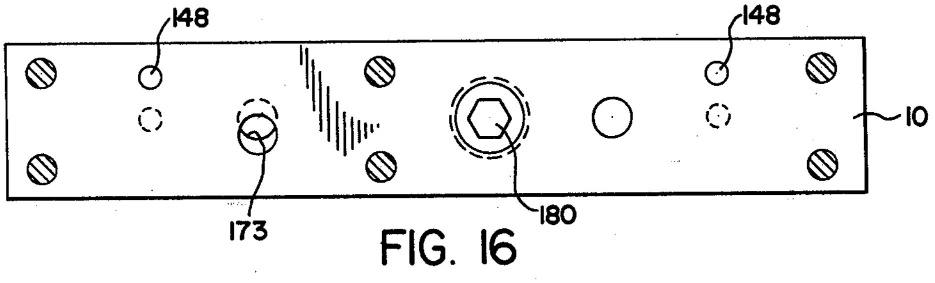
FIG. 16 is a sectional view on an enlarged scale showing the opposite side of the head manifold block of FIG. 15 taken on the line 16—16 of FIG. 5.

Liquid lubricant from the upper tube assembly 100 enters a central passage 146 in the middle tube 132 of lower tube assembly 130 through the port 121 in the intermediate manifold block 60 and travels to the lower end of the tube 132 to a central passage 147 in the inner tube 133. From the passage 147, the liquid passes into a port 148 in the head manifold block 10 (FIGS. 5, 6 and 16). Also, the liquid lubricant passes through four radial ports 149 in the lower end of the middle tube 132 into an outer annular passage 150 between the middle tube 132 and the outer tube 134. However, the annular passage 150 is sealed at its upper end by the seal block 139.

It will be noted that the lower tube assembly 130 elongates or expands in an axial direction as the head manifold block 10 is extended by the head carriage assembly 80. As the clamp bars 82 and 83 carry the coaxial tube unit 131 downward relative to the middle tube 132, the volume of the central passage 146 increases while the volume of the annular passage 150 correspondingly decreases in a manner similar to that of the upper tube assembly 100. Accordingly, the total volume of liquid in the lower tube assembly 130 remains constant during expansion and collapsing movement.

The lower annular space 151 between the coaxial tubes 133 and 134 contains air which enters and exhausts through radial ports 152 in the outer tube 134 to accommodate changes in volume of the space 151.

The extensible conduits 13 and 14 for air will be described with respect to the conduit 13, best illustrated in FIG. 5. Unlike the conduits 11, 12 and 15 for liquids, the air conduits 13 and 14 do not have provision for maintaining a constant volume during expansion and collapsing movement, since that accommodation is not necessary in the case of compressible gases.

The conduit 160 comprises an assembly of coaxial tubes including a fixed tube 161, an intermediate tube 162 and a head tube 163. The fixed tube 161 has an end plug 164 that is clamped by a split clamp ring 166 to the bottom of the fixed manifold block 30. The end plug 164 has a central bore 165 which communicates with the air passage 33 in the fixed manifold block 30 to permit passage of air into the fixed tube 161. The tube 161 extends through the intermediate manifold block 60 and is sealed thereto by a split seal block 167. The upper end of the intermediate tube 162 which is also the outer tube is seated in a recess in the bottom of the intermediate manifold block 60 and its lower end is received in a recess in the carrier block 61. The head tube 163 which is the middle tube of the coaxial assembly extends through the bottom carrier block 61 and is sealed thereto by a sliding seal ring 170 bolted to the bottom face of the carrier block 61. Also, the head tube has a sliding seal 171 between its outer surface and the inner surface of the intermediate tube 162. The lower end of the head tube 163 has an end plug 172 welded thereto with a central passage 173 extending therethrough. The end plug 172 is clamped to the head manifold block by the split clamp ring 136, which is received in an annular groove in the end plug, as shown in FIG. 5.

As indicated above, the construction of the extensible water conduit 15 parallels the construction of the conduits 11 and 12. The exception is the provision of a check valve 180.

CONTROL SYSTEM

Figure 17:
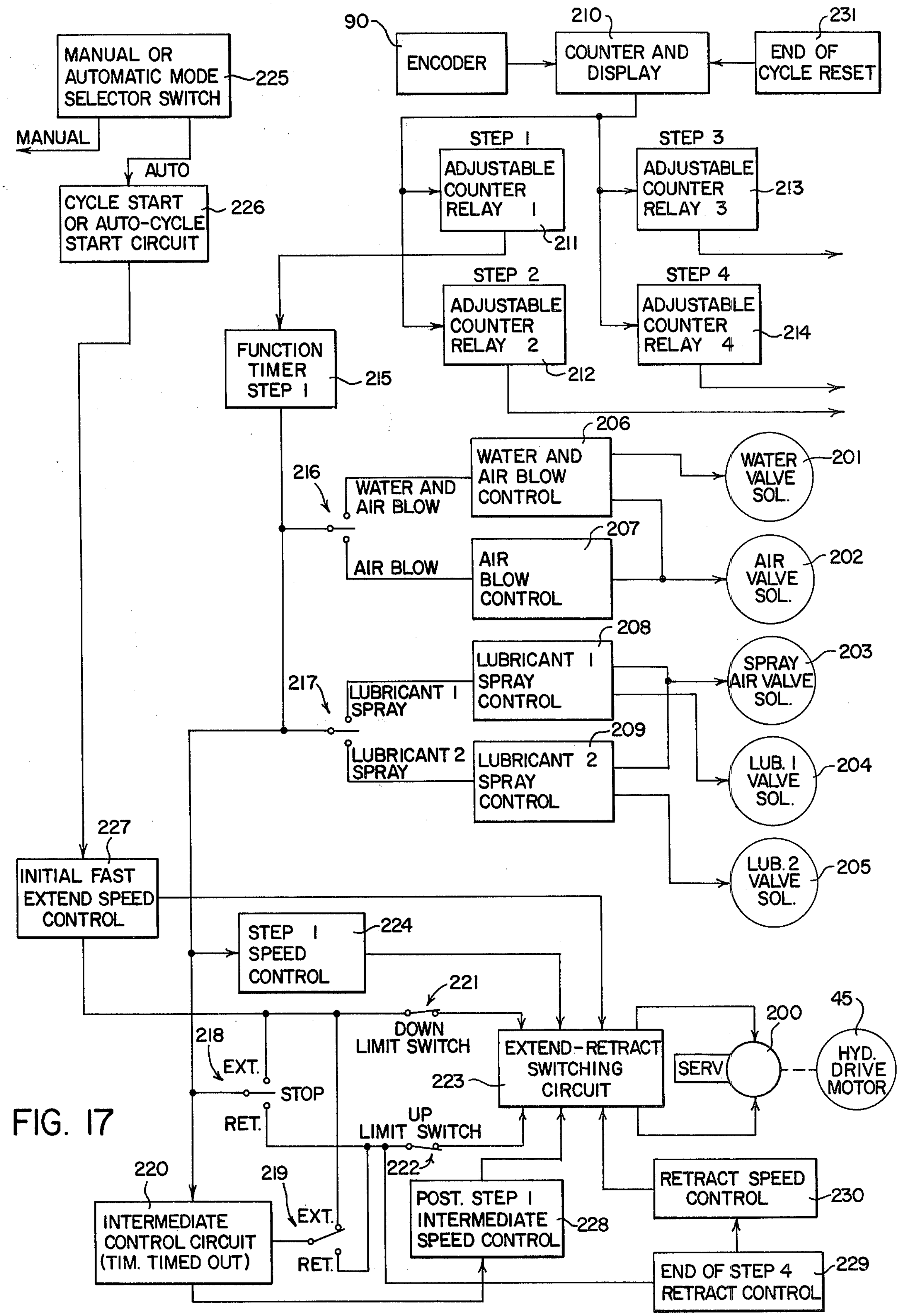
FIG. 17 is a schematic diagram partly in block form illustrating the control system for the apparatus of the invention.

The control system for the apparatus of the invention thus described is illustrated in FIG. 17 which shows, in functional diagrammatic form with certain circuits shown in blocks, the general arrangement of the various components of the system. Control of the operation of the two chain and sprocket drive assemblies 40 and 70 is controlled by a servo-valve 200 that regulates the speed and direction of rotation of the hydraulic drive motor 45. The spray of lubricant and the blowing of air and/or water and air are controlled by a water valve solonoid 201, an air valve solonoid 202, a spray air valve solonoid 203, a first liquid lubricant valve solonoid 204, and a second liquid lubricant valve solonoid 205.

The valves 201, 202, 203, 204, and 205 are controlled by function control circuits, including a water and air blow control circuit 206, an air blow control circuit 207, a first liquid lubricant spray control 208, and a second liquid lubricant spray control 209. The water and air blow control circuit 206 actuates the solonoids 201 and 202 to provide a water and air blow, and the air blow control circuit 207 actuates only the air valve solonoid 202 to provide an air blow function. The first liquid lubricant spray control 208 actuates the solonoids 203 and 204 to provide a spray of the first liquid lubricant and the second liquid lubricant spray control 209 actuates the spray air valve solonoid 203 and the second liquid lubricant valve solonoid 205 to provide a spray of the second liquid lubricant.

As indicated above, the encoder 90 generates pulses in response to increments of rotation of the sprocket 95. These increments of rotation are representative of movement of the fluid emission head D, and accordingly, the cumulative total of pulses at any one time is representative of the total movement of the fluid emission head D. The pulses are fed to a counter and display unit 210 that has a digital display for the total number of pulses received. Associated with the counter and display 210 are four adjustable counter relays 211, 212, 213, and 214, which are used to set the count at which each of the four sequential steps in the operating cycle are to be initiated. The counter and display 210 and the relays 211, 212, 213, and 214 may be, for example, the industrial control sold by DynaPar Corporation of Gurney, Illinois under the trade designation "DYNAPAR 500 CL".

For the purpose of illustration, the control system is shown and will be described with respect to only the first step in the cycle, since the other successive steps are controlled by essentially identical means.

The adjustable counter relay 1 upon counting the preselected pulse total activates the functions and motions of step I and accomplishes this by means of a function timer 215 for step I, which has a predetermined time interval set therein that controls the duration of the function. The particular function to be performed is selected using various selector switches, including a water and air blow selector switch 216, which selects either the water and air blow control 206 or the air blow control 207; and a lubricant spray selector switch 217 which selects either the first liquid lubricant spray control 208 or the second liquid lubricant spray control 209. Both the switches 216 and 217 also have an off position so that either one may be moved to "off" or to a functional position.

The direction of movement of the fluid emission head D (or else a stop condition) is selected with a selector switch 218, and the direction of travel (either extension or retraction) following the completion of the function,—in other words, after the function timer 215 times out—is controlled by a selector switch 219. When the function timer 215 times out, an intermediate control circuit 220 is actuated to control the movement until the adjustable counter relay 2 is activated.

When the extend-stop-retract selector switch 218 is placed in the "extend" position, or when the intermediate-extend-retract selector switch 219 is placed in the "extend" position, the extension movement will continue only until a down limit switch 221 is opened at the lower limit of extension of the carriages 50 and 80. Also, the retraction movement of the carriages 50 and 80 is stopped whenever the intermediate carriage 50 opens the contacts of an up limit switch 222. The up limit switch 222 also causes the counter and display 210 to be reset to 0 and automatically reactivates the start circuit to begin another cycle. The limit switches 221 and 222 are placed in the circuit that inputs to an extend-retract switching circuit 223 that controls the forward-reverse switching of the servo-valve 200. The speed of the fluid emission head D during the timed function for the duration of the preset time interval of the function timer 215 is controlled by the step I speed control 224 that includes an adjustable potentiometer that can be controlled from an operating console.

The control system may be operated either in a manual or an automatic condition, the manual mode being used primarily for setup purposes, and the automatic mode being used for normal machine operation. The selection between manual and automatic is made using the manual-automatic mode selector switch 225 located on the control panel and when the automatic mode is selected, the cycle is initiated using a cycle-start or auto-cycle-start circuit 226. The speed of extension during the initial portion of the cycle is controlled using an initial fast extend speed control 227, having a potentiometer which is preset and not adjustable from the control panel.

After a particular step has been completed and the function timer 215 times out, the speed of extension or retraction following the function, as selected by the selector switch 219 is controlled by a post step I intermediate speed control 228.

After all four adjustable counter relays 211, 212, 213, and 214 for the four steps in the cycle have been activated and the functions all completed, the circuit for step IV activates an end-of-step-IV retract control 229 to initiate retraction of the fluid emission head D. The speed during retraction is controlled by a retract speed control 230, including a potentiometer which can be adjusted from the control panel.

Also, during retraction, special provision is made to utilize the air blow function for a predetermined time period determined by a fifth function timer (not shown). After the fluid emission head D is fully retracted, an end-of-cycle reset control 231 resets the counter and display 210 back to 0 and initiates another cycle through the cycle-start or auto-start circuit 226.

As indicated above, FIG. 17 illustrates the control system only with respect to the control of Step I which is initiated by activation of the adjustable counter relay 211. The control of the other three steps is essentially the same as the control for step I with the exception that completion of step IV activates circuitry to cause retraction of the fluid emission head to complete the respective cycle.

The control system 250 for the die-casting machine C is also interfaced with the control system for the apparatus A to assure that the platens E and F are open and remain open during extension and retraction of the fluid emission head D.

OPERATION

The operation of the reciprocator A will be described first with respect to the setup phase in which an operator determines the timing and the functions to be performed during a complete cycle. Initially, the operator sets the manual or automatic mode selector switch 225 to the manual condition and closes the switch in the cycle-start, or auto-cycle-start circuit 226, to cause initial fast extension of the fluid emission head D. When the head D reaches a desired position between the matched dies 17 and 18, the operator presses a stop switch and observes the pulse count total in the counter and display 210. He then sets the adjustable counter relay 211 to that total so that step I in automatic operation will begin at exactly that position. Then the operator, using the selector switches 216 and 217, selects the function to be performed for step I. He then selects the movement, using selector switch 218, that is to take place during the function of step I. This may be either an extend-retract movement, or a complete stop. Then the operator chooses the speed if the movement is to be extension or retraction, using the step I speed control 224 which has an adjustable potentiometer on the control panel. With these conditions selected, the operator selects the duration of the step I function and sets the duration in the adjustable function timer 215 for step I.

Finally the operator determines what motion of the fluid emission head D will follow the completion of the function of step I after the function timer 215 times out. This selection is made using the selector switch 219, the alternatives being either extension or retraction. Then the speed after the function timer 215 times out is selected using the post I intermediate speed control 228. This completes the setup of the machine for step I of the cycle.

The operator then follows the same procedure successively for steps II, III, and IV, setting the pulse count total for each position that he determines in the respective adjustable counter relays 212, 213, and 214. The operator also sets the speed during retraction using the retract speed control 230 and also elects whether or not an optional air blow is to be used during a portion of the retraction movement. The duration of the optional air blow is selected using another timer (not shown) as indicated above.

After the setup is complete and the die-casting machine C is ready for operation, the operator switches the manual or automatic mode selector switch 225 to the automatic mode position and presses the cycle-start switch of the cycle-start or auto-start circuit 226 to begin the first cycle of the automatic operation of the reciprocator A. The cycle begins with initial fast extension of the fluid emission head D as controlled by the initial fast-extend speed control 227, and at the same time, the encoder generates pulses representative of the total movement of the fluid emission head. These pulses are fed to the counter and display 210 which visually displays the cumulating count total. When the total count reaches the preset total of the step I adjustable counter relay 211, the function timer 215 for step I is activated to begin the timing of the function of step I, and the function is also initiated by opening of the respective predetermined valves controlled by the solonoids 201, 212, 213, 214, and 205, the particular function having been preselected using the switches 216 and 217.

At the same time, the counter relay 211 halts the initial fast extension movement of the fluid emission head D and controls the servo-valve 200 in accordance with the setting of the extend-retract-stop selector switch 218 that has been preset by the operator. If the operator has selected the stop position, of course, the servo-valve 200 will stop the hydraulic drive motor 45 altogether until the function timer 215 times out.

When the timer 215 times out, the intermediate control circuit 220 is activated and the servo-valve will cause operation of the drive motor in the direction preselected using the selector switch 219. The speed of travel is controlled by the control 228, and this motion will continue until the step II adjustable counter relay 212 receives the predetermined total count from the counter and display 210, at which time, step II is initiated. The function and motion for step II are controlled by a control circuit similar to that illustrated with respect to step I in FIG. 17.

After step IV is completed, the control circuit 229 is actuated to initiate retraction movement of the fluid emission head D. The speed during retraction is controlled using the retract speed control 230 which is preset by the operator on the control panel. As the carriages 50 and 80 reach their fully retracted position, the up limit switch 222 is opened to halt the retraction movement and also to reset the counter and display 210 and actuate the auto-cycle-start circuit 226 to begin another cycle.

It will be noted that the control of the apparatus A is accomplished by signals representative of the total movement of the carriages 50 and 80 during a particular cycle so that the position of the fluid emission head is exactly the same from one cycle to the next as any particular step in the cycle is initiated. There can be no variation in successive cycles due to changes in temperature or viscosity of the hydraulic fluid that drives the hydraulic drive motor 45. Also, the setup of the machine is very quickly and easily accomplished using the adjustable counter relays 211, 212, 213, and 214 which require very little training and skill to adjust. On the other hand, the duration of the four functions is controlled using function timers, such as the timer 215 for step I, so that the function can be performed at full stop if desired.

It should be noted that the step conditions can be readjusted by an operator during operation of the machine whenever desired. For example, the liquid lubricant spray can be changed or eliminated, the water and air blow, or air blow, can be changed or eliminated, the function timers can be changed as can the step speed control and the adjustable counter relays.

It should be noted that other steps may be added as desired, or that certain steps may be eliminated. For most purposes, however, four functional steps will more than adequately satisfy the requirements of an operating cycle.

While the invention has been shown and described with respect to a specific embodiment thereof, this is intended for the purpose of illustration rather than limitation, and other variations and modifications in the particular form herein shown and described will be apparent to those skilled in the art, all within the intended spirit and scope of the invention. Accordingly, the invention is not to be limited in scope and effect to the specific embodiment herein shown and described, nor in any other way that is inconsistent with the extent to which the progress in the art has been advanced by the invention.

We claim:

1. Apparatus for automatically moving a reciprocating operating head successively through variable-speed, variable-function operating cycles that include linear extension and retraction to and from a space within which predetermined operations are to be sequentially performed, comprising:

a fixed frame, first chain-and-sprocket drive means on said frame, an intermediate carriage on said fixed frame operatively connected to said first chain-and-sprocket drive means and adapted to be moved linearly thereby relative to said frame between a retracted position on said frame and an extended position projecting outwardly from said frame, second chain-and-sprocket drive means on said intermediate carriage, rack means on said frame, a pinion mounted on said intermediate carriage for operative engagement with said rack means, said pinion being operatively connected to said second chain-and-sprocket drive means for driving said second chain-and-sprocket drive means in response to movement of said intermediate carriage relative to said frame, and a head carriage on said intermediate carriage operatively connected to said second chain-and-sprocket drive means and adapted to be moved linearly thereby relative to said intermediate carriage between a retracted position on said intermediate carriage and an extended position projecting outwardly from said intermediate carriage, said operating head being mounted on said head carriage.

2. Apparatus as defined in claim 1 including a rotary hydraulic drive motor for operating said first drive means.

3. Apparatus as defined in claim 1 wherein said operating head is a fluid emission head adapted to spray adjacent surfaces in said space.

4. Apparatus as defined in claim 3 including inflexible, extensible conduit means for conducting fluid from fluid connection means associated with said fixed frame to said fluid emission head.

5. Apparatus as defined in claim 4 wherein said conduit means comprises:

at least one assembly of tubes including two tube units movable axially relative to one another through axial elongation and collapsing movements, one of said units being fixed relative to said frame and the other being movable relative to said frame, and one of said units comprising a middle tube and the other unit comprising an outer tube and a coaxial inner tube, said middle tube having a forward end slidably located coaxially between said outer tube and said inner tube, and seal means at said forward end of said middle tube sealing the annular space between said outer tube and said middle tube and the annular space between said middle tube and said inner tube, to define a variable-volume, first fluid space within said middle tube and defined by said middle tube and said inner tube, that increases in volume as said assembly is axially elongated, and an annular, variable-volume, second fluid space between said middle tube and said outer tube, that decreases in volume when said assembly is axially elongated whereby the increase in volume of said first fluid space during said axial elongation is approximately equal to said decrease in volume of said second fluid space.

6. Apparatus as defined in claim 5 wherein the cross sectional area defined within the outer circumference of said inner tube is approximately equal to the cross sectional area of said annular second fluid space.

7. Apparatus as defined in claim 5 wherein said conduit means for at least one fluid to be transmitted to said fluid emission head comprises two of said tube assemblies, serially connected to one another, one of said tube assemblies being connected between said fixed frame and said intermediate carriage and the other of said tube assemblies being connected between said intermediate carriage and said fluid emission head.

* * * * *